United States Patent
Lin

(10) Patent No.: US 7,779,635 B2
(45) Date of Patent: Aug. 24, 2010

(54) SOLAR ENERGY POWER GENERATOR

(76) Inventor: Wen Chang Lin, 235 Chung-Ho Box 8-24, Taipei (TW)

(*) Notice: Subject to any disclaimer, the term of this patent is extended or adjusted under 35 U.S.C. 154(b) by 323 days.

(21) Appl. No.: 11/930,192

(22) Filed: Oct. 31, 2007

(65) Prior Publication Data

US 2009/0107146 A1  Apr. 30, 2009

(51) Int. Cl.
*F03G 6/00* (2006.01)
(52) U.S. Cl. .................. 60/641.11; 60/641.12
(58) Field of Classification Search .... 60/641.8–641.15
See application file for complete search history.

(56) References Cited

U.S. PATENT DOCUMENTS 4,280,328 A * 7/1981 Falconer ................. 60/641.12
4,452,046 A * 6/1984 Valentin ................. 60/641.11
4,935,639 A * 6/1990 Yeh ........................... 290/55
5,228,293 A * 7/1993 Vitale ..................... 60/641.14
5,300,817 A * 4/1994 Baird .......................... 290/55

* cited by examiner

*Primary Examiner*—Hoang M Nguyen

(57) ABSTRACT

A solar energy power generator comprises a solar energy heating device for absorbing solar energy for heating medium flowing therethrough; a secondary heating device for further heating medium flowing through the solar energy heating device so as to generate air convection; and a power generator for generating electric power by air convection for driving a load. The solar energy heating device and the secondary heating device heat air so that air convection generates in the hot air convection space so as to drive the power generator to generate electric power for driving a load.

5 Claims, 3 Drawing Sheets

SOLAR ENERGY POWER GENERATOR

FIELD OF THE INVENTION

The present invention relates to power generators, and particularly to a solar energy power generator for driving a power generator to generate electric power without any pollution to the environment.

BACKGROUND OF THE INVENTION

In current highly technological and highly economic lives, electric power is necessary for mechanics and electricity. However most of current power source for generating electric power is generated from charcoal, petroleum, natural gas, uranium, etc. These can not be reused and will be exhausted in near future. Moreover, these non-reused energy sources will pollute the environment and generate ecological crisis. However solar energy is a clean energy which generates no pollution to the environment and has no ecological crisis. Thus solar energy has become a main trend of an energy source for substituting the conventional energy sources.

SUMMARY OF THE INVENTION

Accordingly, the primary object of the present invention is to provide a solar energy power generator for driving a power generator to generate electric power without any pollution to the environment.

The object of the present invention is to provide a solar energy power generator for driving a power generator to generate electric power without any pollution to the environment.

A solar energy power generator comprises a solar energy heating device which absorbs solar energy for heating medium flowing therethrough; a secondary heating device for further heating medium flowing through the solar energy heating device so as to generate air convection; and a power generator for generating electric power by air convection for driving a load. The solar energy heating device and the secondary heating device heat air so that air convection generates in the hot air convection space so as to drive the power generator to generate electric power for driving a load.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
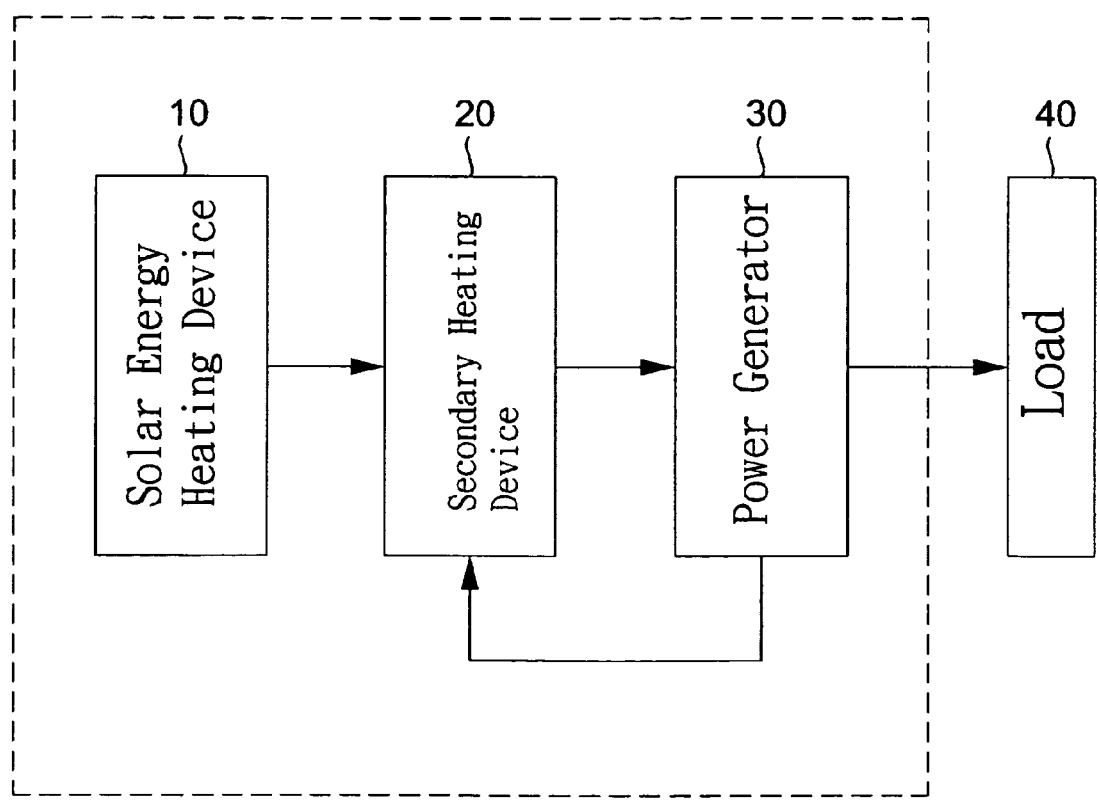
FIG. 1 is a system block diagram of the present invention.

Referring to FIG. 1, the system structure of the present invention is illustrated. The elements of the present invention will be described herein.

A solar energy heating device 10 (referring to FIG. 1) serves for absorbing solar energy for heating medium (such as air or water) flowing therethrough.

A secondary heating device 20 (referring to FIG. 1) serves for further heating medium flowing through the solar energy heating device 10 so as to generate air convection.

A power generator 30 (referring to FIG. 1) generates electric power by air convection for driving a load 40. Moreover, the output power from the power generator 30 can be feedback to the secondary heating device 20.

Thereby the present invention provides a power generator by hot air convection.

Figure 2:
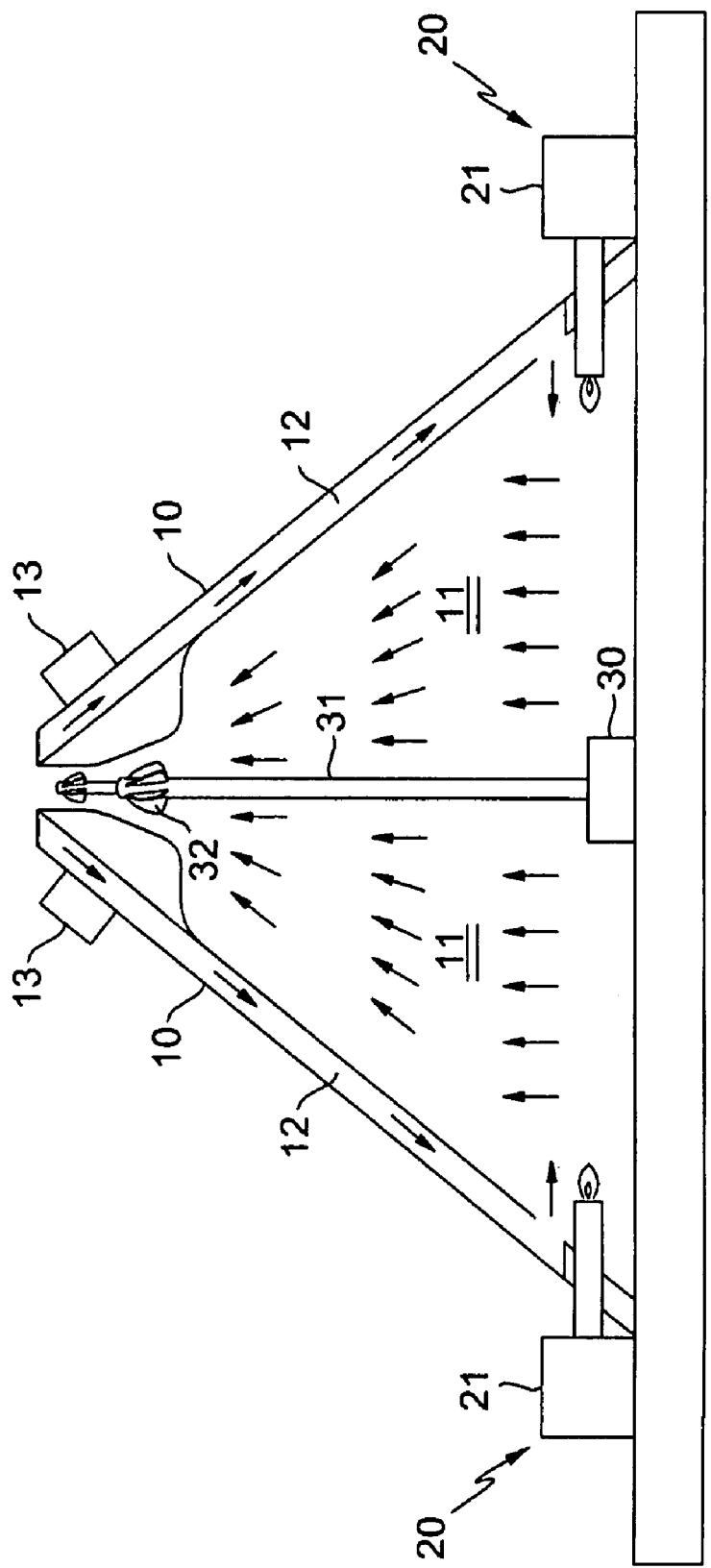
FIG. 2 is a schematic view showing the embodiment of the present invention.

Referring to FIG. 2, the electric power system of the present invention is further described herein.

Preferably, the solar energy heating device 10 (referring to FIG. 2) has a hot air convection space 11 which is a tapered space with a narrow upper side and a wide lower side. The solar energy heating device 10 further has a channel 12. Air passes through the channel 12. An opening of the channel 12 has a blower 13 for enforcing outer air to enter into an upper end of the channel 12. The air into the channel 12 is heated by the solar energy heating device 10 and then is exhausted out from a lower end of the channel 12.

The secondary heating device 20 includes a combustor 21. The fuels of the combustor 21 are hydrogen and oxygen. The flame of the combustor 21 serves to heat the solar energy heating device 10 directly and then to heat the air entering into the hot air convection space 11 further so as to enhance the heat energy of the air and thus the air convection is increased.

The power generator 30 has a rotary shaft 31 which is installed in the hot air convection space 11. The rotary shaft 31 is installed with blades 32.

By above mentioned structure, the solar energy heating device 10 and secondary heating device 20 heat air so that the heated air has convection in the hot air convection space 11. The convection of hot air will drive the blades 32 so that the rotary shaft 31 will drive the power generator 30 to operate. Thus electric power is generated for driving a load (not shown in FIG. 2).

Figure 3:
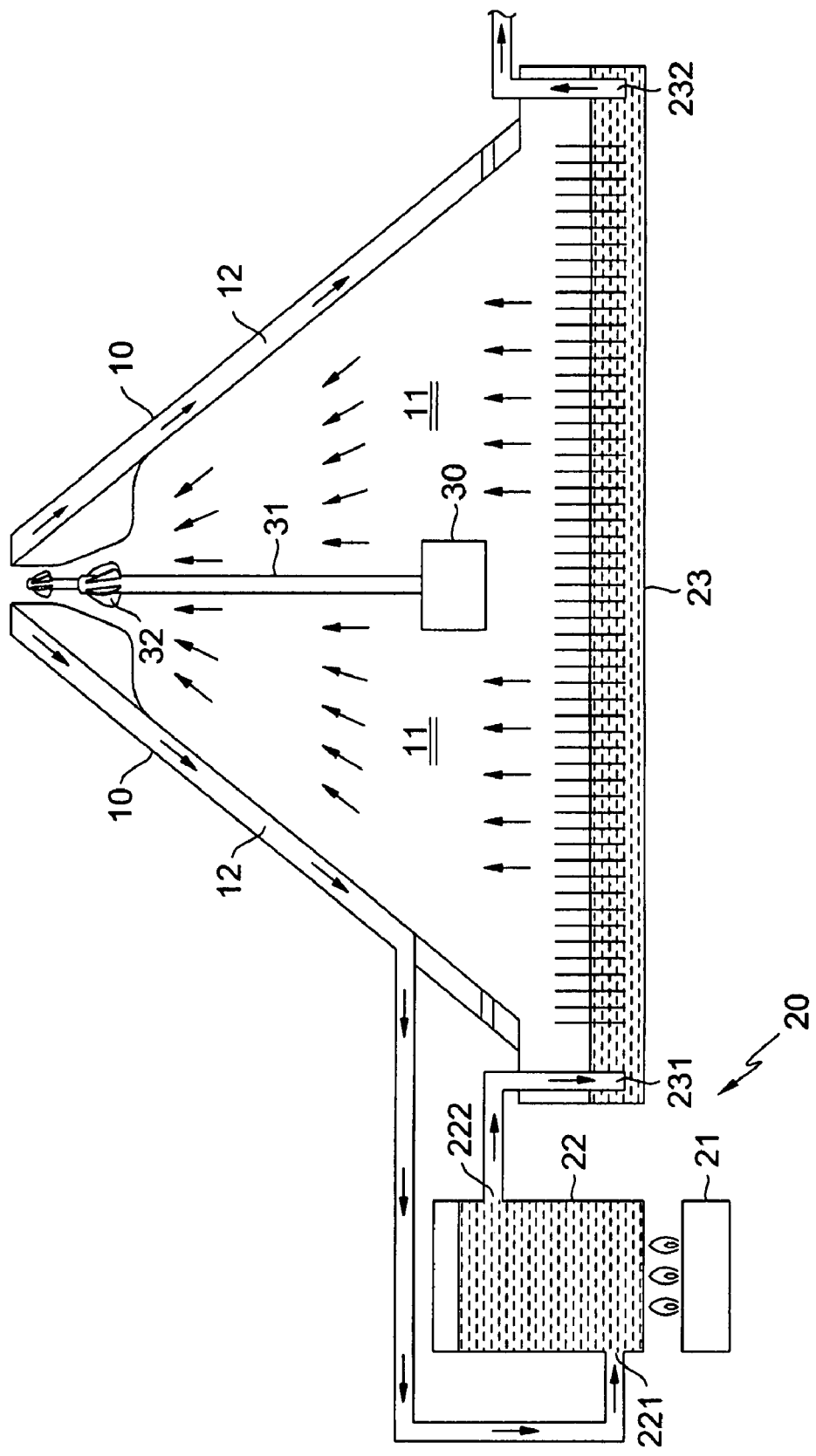
FIG. 3 shows another embodiment of the present invention.

Further, referring to FIG. 3, another embodiment of the electric power generator is illustrated. The device has the following elements.

The solar energy heating device 10 (referring to FIG. 2) is a device for absorbing solar energy. Preferably, the solar energy heating device 10 (referring to FIG. 2) has a hot air convection space 11 which is a tapered space with a narrow upper side and a wide lower side. The solar energy heating device 10 further has a channel 12. Water passes through the channel 12. The water entering into the channel 12 is heated by the solar energy heating device 10 and then is exhausted out from a lower end of the channel 12.

The secondary heating device 20 (referring to FIG. 2) includes a combustor 21, a heating boiler 22, and a heat exchanger 23. The fuels of the combustor 21 are oxygen and hydrogen. The heating boiler 22 has a water inlet end 221 and a water outlet end 222. The water inlet end 221 is connected to the channel 12 of the solar energy heating device 10 for receiving hot water from the solar energy heating device 10 so as to guide the hot water to the solar energy heating device 10. The flame from the combustor 21 will heat the water in the heating boiler 22 again so as to further heat the hot water. The heat exchanger 23 is installed in a lower portion of the hot air convection space 11. The heat exchanger 23 has a water inlet end 231 and a water outlet end 232. The water inlet end 231 is connected to the water outlet end 222 of the heating boiler 22 for guiding hot water from the heating boiler 22 to the heat exchanger 23. The water outlet end 232 of the heat exchanger 23 is connected to the channel 12 of the solar energy heating device 10 for guiding hot water in the heat exchanger 23 to the solar energy heating device 10 for reusing (referring to FIG. 3).

The power generator 30 (referring to FIG. 3) has a rotary shaft 31. The rotary shaft 31 is installed in the hot air convection space 11. The rotary shaft 31 has blades 32.

By above mentioned structure, the solar energy heating device 10 and the secondary heating device 20 serves to heat water. The heat exchanger 23 can exchange air in the hot air convection space 11 so as to heat air in the hot air convection space 11 and thus the air in the hot air convection space 11 will generate convection. The hot air serves to drive the blades 32 to further drive the rotary shaft 31 so as to output electric power (referring to FIG. 3).

Advantages of the present invention will be described herein.

In the present invention, power source is air convection, which is cheaper than coals, petroleum, natural gas or uranium and generates no pollution to the environment.

Moreover, in the present invention, the fuel of the solar energy heating device and the combustor are oxygen and hydrogen which can be decomposed from water and thus no pollution to the environment.

Furthermore, in the present invention, the solar energy heating device uses air and water as medium for heat transfer. The medium can be reused without any pollution to the environment.

Besides, the power from the system of the present invention other than used by a load, the power can be feedback to the system as a power source.

Thus from above description, it is known that in the present invention, hot air convection is used to drive a power generator and provide power without any pollution.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. The solar energy power generator comprising:

a solar energy heating device being a device for absorbing solar energy; the solar energy heating device having a hot air convection space; the solar energy heating device further having a channel; water passing through the channel; the water entering into the channel being heated by the solar energy heating device and then is exhausted out from a lower end of the channel; and the secondary heating device including a combustor, a heating boiler, and a heat exchanger; the heating boiler having a water inlet end and an water outlet end; the water inlet end of the heating boiler being connected to the channel of the solar energy heating device for receiving hot water from the solar energy heating device so as to guide the hot water to the solar energy heating device; the flame from the combustor will heat the water in the heating boiler again so as to further heating the hot water; the heat exchanger having a water inlet end and a water outlet end; the water inlet end of the heat exchanger being connected to the water outlet end of the heating boiler for guiding hot water from the heating boiler to the heat exchanger; and a power generator having a rotary shaft; the rotary shaft being installed in the hot air convection space; the rotary shaft having blades; and wherein the solar energy heating device and the secondary heating device serves to heat water; the heat exchanger exchange heat from water to air in the hot air convection space so as to heat air in the hot air convection space so that the air in the hot air convection space will generate convection; the hot air serves to drive the blades to further drive the rotary shaft so as to output electric power.

2. The solar energy power generator as claimed in claim 1, wherein hot air convection space is a tapered space with a narrow upper side and a wide lower side.

3. The solar energy power generator as claimed in claim 1, wherein the fuels of the combustor are hydrogen and oxygen.

4. The solar energy power generator as claimed in claim 1, wherein the heat exchanger is installed in a lower portion of the hot air convection space.

5. The solar energy power generator as claimed in claim 1, wherein the water outlet end of the heat exchanger is connected to the channel of the solar energy heating device for guiding hot water in the heat exchanger to the solar energy heating device for reusing.

* * * * *